Aug. 3, 1954
E. W. LARSEN
2,685,362
STRAND FEEDING APPARATUS
Filed July 9, 1949
3 Sheets-Sheet 1
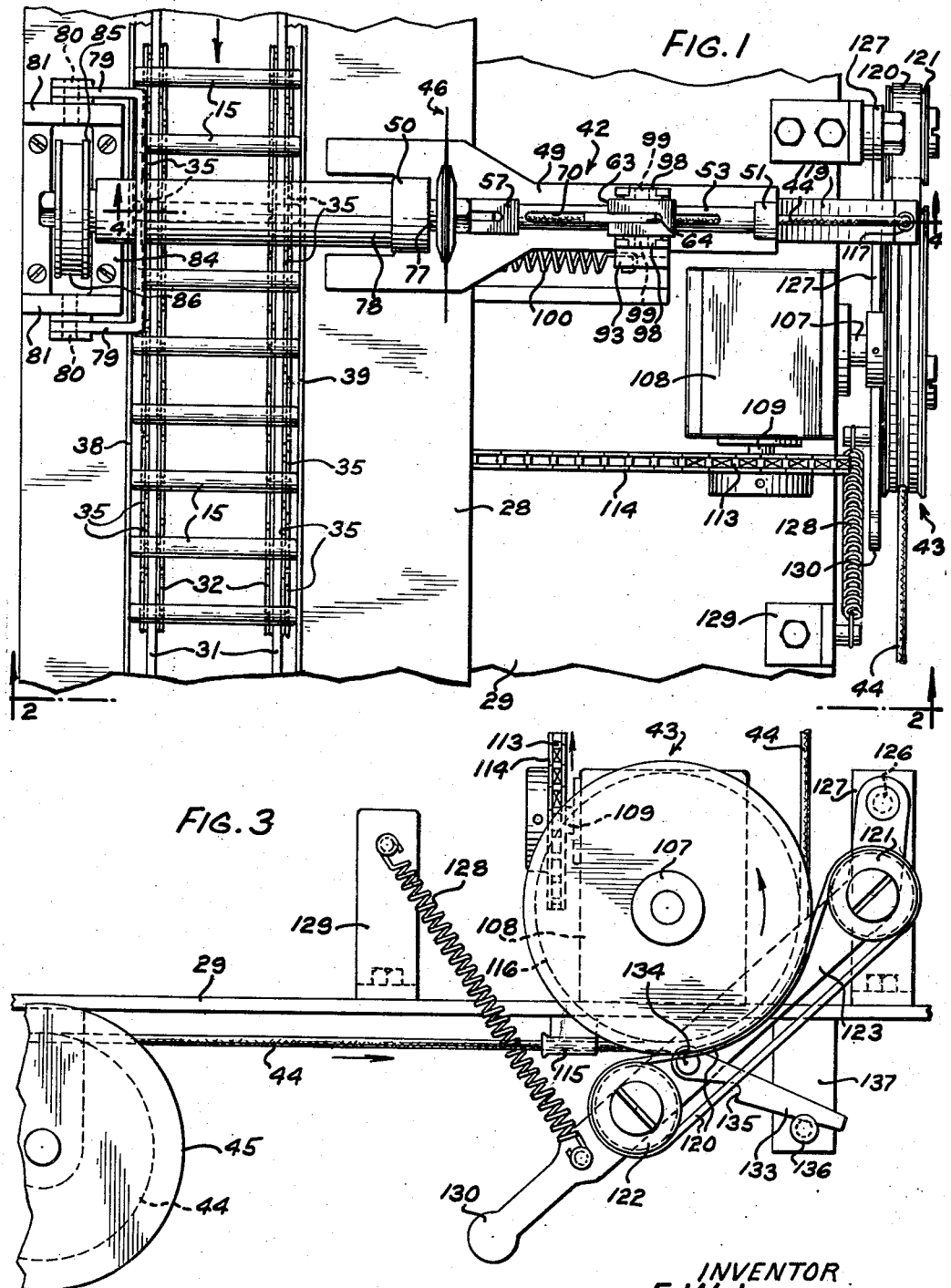
INVENTOR
E. W. LARSEN
BY
ATTORNEY

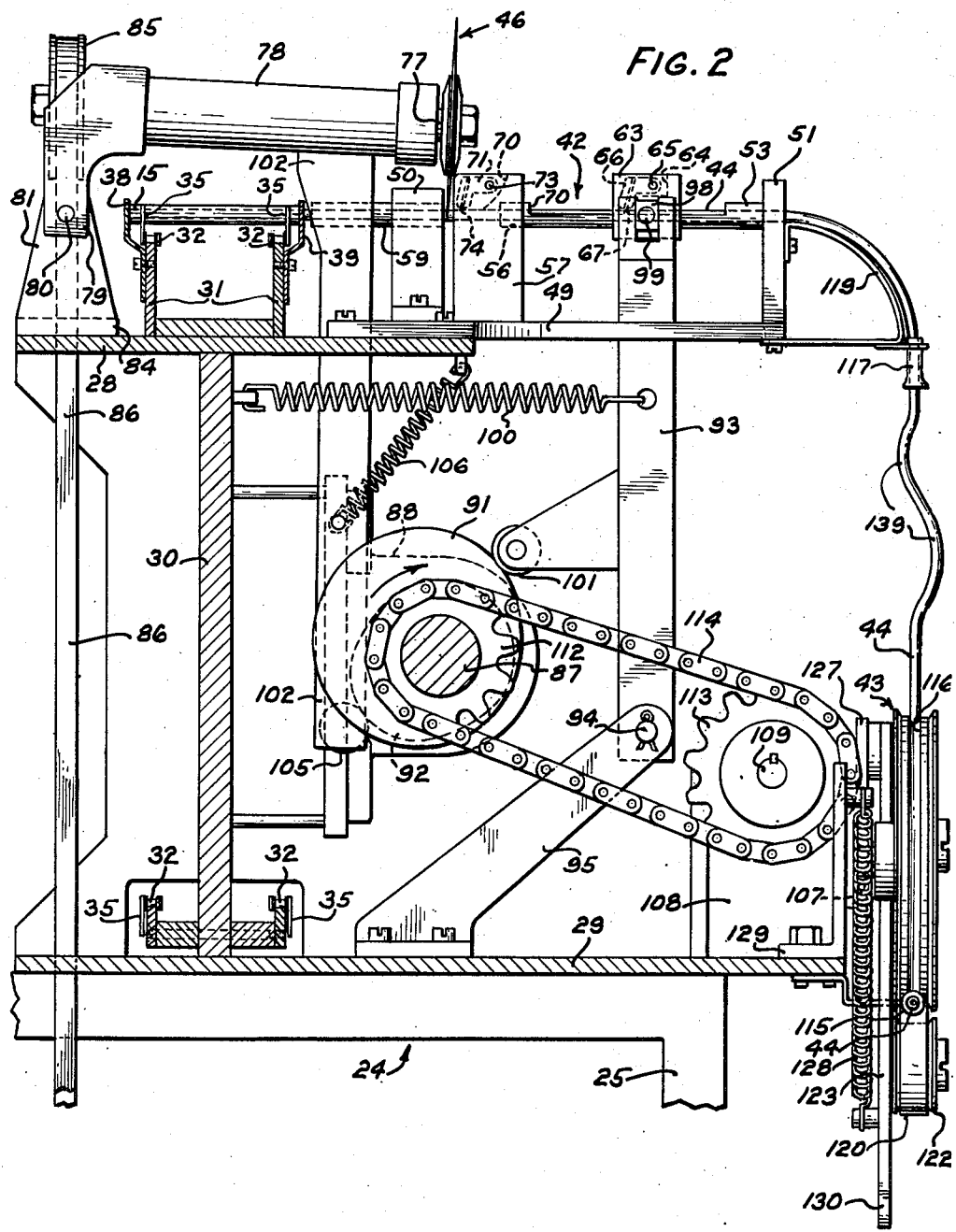

Aug. 3, 1954
E. W. LARSEN
2,685,362
STRAND FEEDING APPARATUS
Filed July 9, 1949
3 Sheets-Sheet 3
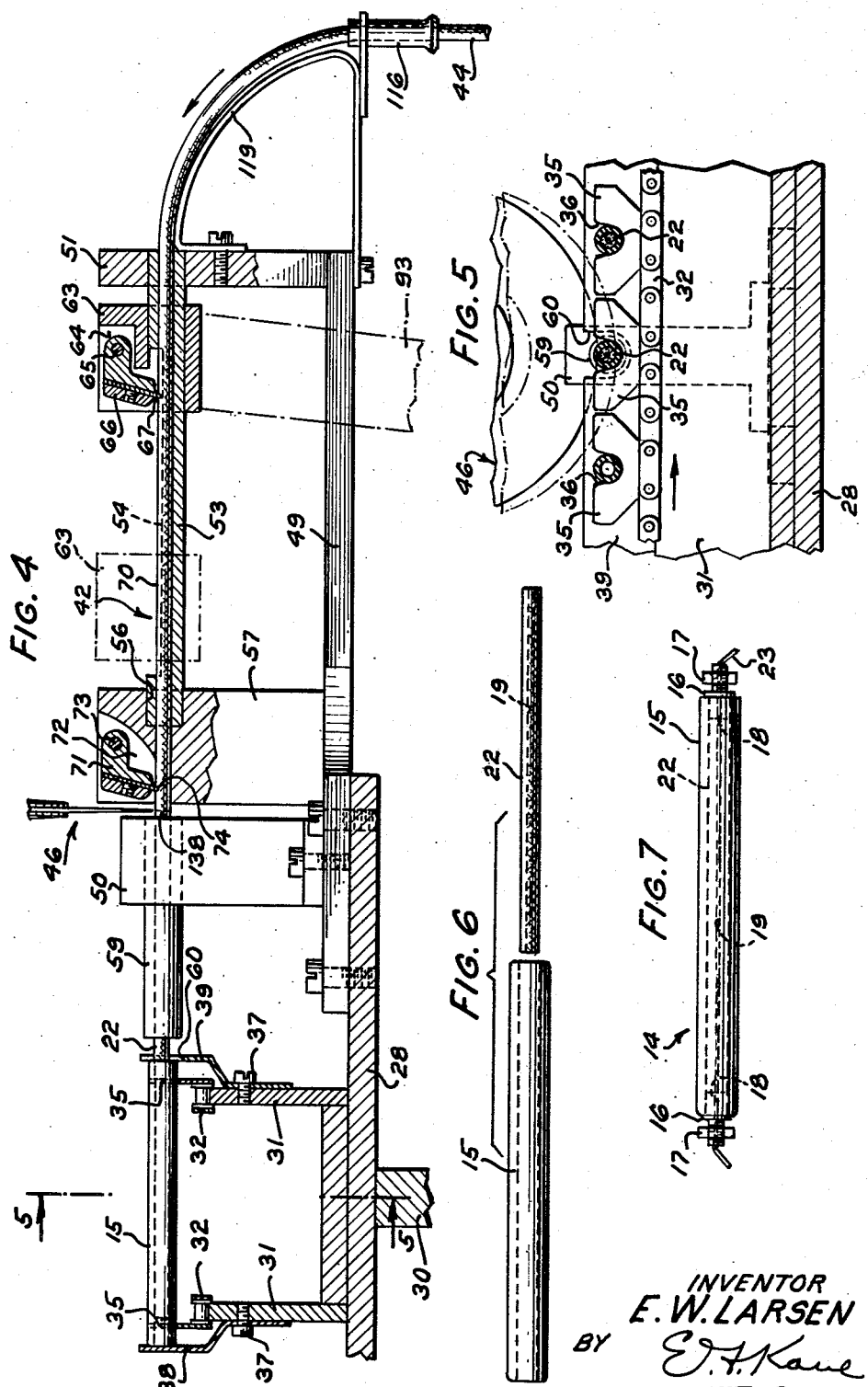
INVENTOR
E. W. LARSEN
BY
E. F. Kane
ATTORNEY Patented Aug. 3, 1954

2,685,362

UNITED STATES PATENT OFFICE 2,685,362

STRAND FEEDING APPARATUS

Einer W. Larsen, Elmhurst, Ill., assignor to Western Electric Company, Incorporated, New York, N. Y., a corporation of New York Application July 9, 1949, Serial No. 103,818

3 Claims. (Cl. 203—20)

This invention relates to apparatus for feeding strand material into tubular members and more particularly to an apparatus for continually withdrawing elongated material from a supply, intermittently feeding and severing a predetermined length therefrom and inserting it into a tubular member.

An object of the present invention is to provide a simple and efficiently operable apparatus for expeditiously assembling such lengths of strand material in tubular members.

Another object is to assemble lengths of such material in a succession of tubular members with a required constant length of severed material and without intermittently accelerating and decelerating a heavy supply of strand material.

In accordance with one embodiment of the invention, an apparatus is provided for assembling relatively flexible and delicate sleeving made of asbestos in pre-cut tubular fiber shells for use in electrical fuses. A freely rotatable supply spool is provided for holding a supply of asbestos sleeving to be inserted into aligned shells positioned one at a time at an inserting station. The sleeving is withdrawn from the supply spool by a capstan rotated at constant velocity so that the sleeving will be withdrawn from the supply at a constant rate and will be advanced into position to be inserted in the shells by an intermittently reciprocable feeding device, the feeding device being operated in timed relation to the speed of the capstan so that, through the cooperative action of these two elements, a definite length of sleeving will be fed each time the feeding device reciprocates. The feeding device is interconnected with its driving source by a resilient actuator, whereby exactly the same lengths of sleeving will be fed each time the feeding device reciprocates since the capstan, having fed a fixed length of sleeving, will prevent an excess amount being fed and will thus control the lengths of sleeving fed, while obviating the necessity for stopping and starting a large supply spool.

This feeding device operates in timed relation to a cut-off device, which becomes effective to cut off a length of sleeving each time the feeding device is reciprocated and leave this length of sleeving in a position whereupon, the next length of sleeving being advanced, the cut-off length of sleeving will be pushed thereby into the shell aligned with it at the inserting station.

The arrangement is such that with the capstan continually withdrawing sleeving from the supply spool at a predetermined constant rate, the intermittent reciprocation of the feeding and inserting device results in a slack length of sleeving being intermittently accumulated between the capstan and the feeding and inserting device during each operating cycle. This slack length of sleeving is completely taken up by the advance movement of the resiliently actuated feeding and inserting device, since the feeding device tends to feed more sleeving past the knife than the capstan will supply for each feeding cycle due to the action of its resilient actuator. The purpose of this action tending to overfeed the sleeving is to take care of any slippage of the feeding device on the sleeving during feeding thereby, and this occurs without varying the constant action of the capstan to govern the length of the sleeving fed past the knife. Also, no intermittent acceleration and deceleration of the relatively heavy supply spool of the delicate asbestos sleeving occurs, tending to break such sleeving, since the sleeving is constantly being withdrawn from the freely rotatable spool.

Other objects and advantages of this invention will more fully appear from the following detailed description, taken in conjunction with the accompanying drawings, in which Fig. 1 is a fragmentary, plan view of an apparatus embodying the features of the invention, the feeding and inserting mechanism being shown in an intermediate position;

Fig. 2 is a fragmentary, enlarged, vertical section taken on the line 2—2 of Fig. 1;

Fig. 3 is a fragmentary, end view of the apparatus looking toward the right end of Fig. 2;

Fig. 4 is a fragmentary, enlarged, vertical section taken on the line 4—4 of Fig. 1, the feeding and inserting mechanism being shown in its fully retracted position;

Fig. 5 is a fragmentary vertical section taken on the line 5—5 of Fig. 4;

Fig. 6 is an enlarged view of the fiber fuse shell having an asbestos sleeve aligned therewith preparatory to the latter's insertion into the former; and Fig. 7 is a view of a completely assembled fuse.

Referring now to the drawings, there is illustrated in Figs. 1 and 2 a portion only of an apparatus for assembling electrical fuses of the general type illustrated in Fig. 7. A fuse of this type, indicated in general at 14, comprises a tubular shell 15 of insulating material, such as fiber, in the ends of which there are suitably fixed sleeve-like metallic end members 16, screw-threaded to receive positioning nuts 17. The end members 16 are each provided with a central aperture 18, which is in alignment with an aperture 19 in a tubular member or sleeve 22 of delicate flame-resistant material, such as asbestos, which is entered into the hollow of the shell 15. Extending through the aligned apertures 18 and 19 is a fuse wire 23, having its projecting ends slightly bent over to maintain the fuse wire in assembled relation with the other parts of the fuse prior to soldering the ends.

The features of the present invention relate only to that portion of the fuse assembling apparatus for inserting the asbestos sleeve 22 into the hollow of the fiber shell 15, which is carried out before the assembling of the end members 16, nuts 17 and fuse wire 23 and other subsequent operations are performed on the fuse 14.

The apparatus of the invention is supported on a table 24 provided with spaced standards 25, one of which is shown fragmentarily in Fig. 2. Two horizontally extending plates 28 and 29, vertically spaced apart by a vertical plate 30, are fixed to the standards 25, upon which is directly mounted the following apparatus. Upon the plate 28 are two spaced, vertical rails 31—31, upon the upper edge faces of which two aligned endless sprocket chains 32—32 ride. Each of the chains 32—32 has fixed to its outer side face, as best shown in Figs. 4 and 5 and at suitable equally spaced points, a pair of V-shaped cradle members 35—35 having notches 36—36 (Fig. 5) formed in their upper edges, the notches in opposite cradle members being in alignment and of such dimensions as to freely receive and support opposite end portions of a fuse shell 15. The endless chains 32—32 are guided and moved step by step at predetermined periods in the direction of the arrow (Fig. 1) by suitable mechanism (not shown) operating in timed relation to other periodic operations of the apparatus to be presently described. At a point (not shown) disposed beyond the upper end of the chains 32—32, as viewed in Fig. 1, and while the chains are stationary, the aligned notches 36—36 of each pair of cradle members 35—35 are supplied with a fuse shell 15 from a suitable delivery mechanism or they may be delivered thereto manually. In the present application, complete details of the mechanisms for guiding and driving the endless chains 32—32 step by step and supplying fuse shells 15 thereto have been omitted for the sake of simplicity since such details are not essential to a complete understanding of this invention. The rails 31—31 have fixed to their outer side faces, as indicated at 37—37, angularly formed plates 38 and 39, having their upper portions similarly spaced from the adjacent sides of the chains 32—32, the plates serving to predeterminedly, longitudinally position and maintain the fuse shells 15 with respect to the chains.

An asbestos sleeving feeding and sleeve inserting mechanism is indicated at 42, which, in cooperation with a capstan, indicated at 43 (Figs. 1, 2 and 4) rotated at a predetermined constant velocity, draws such sleeving 44 from a freely rotatable supply spool 45 (Fig. 3) and feeds a suitable length of the sleeving past a rotating knife, indicated at 46, and simultaneously therewith inserts a previously severed length of the sleeving 22 into an aligned fiber shell 15.

The mechanism 42 comprises a base plate 49 fixed to the table plate 28 to the right of the path of the chains 32—32 (Figs. 1, 2 and 4). At opposite ends of the base plate 49 are fixed standards 50 and 51. Fixed at one end in an aperture in the standard 51 is a sleeve-like member 53 having its opposite end fixed in an enlarged diameter of an aperture 56 in a standard 57, mounted on the table plate 28, adjacent the standard 50. Supported on the standard 50 and fixed in an aperture thereof is one end of a tubular member 59, the opposite annular end face of which lies adjacent the fiber tube positioning plate 39 on the rail 31. The sleeve-like member 53 and tubular member 59 are coaxially aligned and the asbestos sleeving 44 is guided therethrough during its feeding movement, and in unison therewith the previously severed length of sleeving, comprising the sleeve 22, is inserted into an aligned fiber shell 15, which had been stepped into position for receiving it during the period when the sleeving 44 is not being advanced. As clearly shown in Figs. 4 and 5, the positioning plate 39 is provided at the inserting station with a notch 60 in its upper edge in alignment with the members 50, 53 and 59 so that the asbestos sleeve 22 may be fed into the fiber shell 15.

Reciprocably supported on the sleeve-like member 53 is a sleeving feeding and sleeve inserting head 63 having a slot 64 in its upper portion. Pivotally carried in the slot 64 of the head 63, as indicated at 65, is a gravity actuated pawl 66 supporting a sharp pointed pin 67, which is slightly inclined from the vertical in a direction opposite to the direction of feed of the asbestos sleeving 44, the lower pointed end of the pin being arranged to impinge the sleeving 44 when the head 63 is advanced to the left to the broken outline position thereof, as viewed in Fig. 4 to advance the sleeving therewith. A slot 70 of suitable length is formed in the upper portion of the wall of the sleeve-like member 53 to permit the engagement of the pin 67 with the sleeving 44. During the retraction of the head 63 to the full line position thereof the pin 67 withdraws from impinging relation with the asbestos sleeving 44 and rides idly thereon. The standard 57, which is stationary, also supports a gravity actuated pivotal pawl 71 similar to the pawl 66, the pawl 71 being carried in a slot 72 in the upper portion of the standard and pivoted at 73. A pin 74 carried on the pawl 71, and similar to the pin 67 of the pawl 66, is arranged to idly ride on the asbestos sleeving 44 during its advance movement by means of the feeding head 63 and to impinge the sleeving 44 during the retraction of the head, thus positively maintaining the sleeving in its advanced position and insuring that no backward movement thereof will occur.

The rotating knife 46, which is of the disk type, is fixed to one end of a shaft 77, which is journalled in a tubular housing 78 having spaced aligned arms 79—79 at its left end (Figs. 1 and 2), which are pivoted at 80—80 to vertically extending spaced aligned arms 81—81 of a standard 84 fixed to the table plate 28. Fixed to the shaft 77 at its end opposite to that which supports the rotating knife 46 is a pulley 85, which is constantly driven in the operation of the apparatus by a belt 86, shown fragmentarily, and receiving motion from a suitable source of power, such as an electric motor (not shown).

In timed relation to the completion of an advance movement of the head 63 to the left, as viewed in Figs. 2 and 4, to feed the asbestos sleeving 44, the housing 78 is oscillated slightly in a clockwise direction about its pivots 80—80 to swing the continuously rotating disk type knife 46 into severing relation with the exposed portion of the sleeving 44, which is located in the space between the standards 50 and 57, to the position shown in Fig. 2. The oscillatory movements of the severing knife 46 are so slight that no interference in the continuous drive to the knife by the belt 86 and pulley 85 occurs.

The intermittent reciprocatory movements of the sleeving feeding and sleeve inserting head 63 and the intermittent oscillatory movements of the continuously rotating knife 46 to sever the sleeving 44 into predetermined lengths to provide the sleeves 22, which operations occur in predetermined timed relation during the continuous uninterrupted withdrawal of the sleeving 44 from the freely rotatable supply spool 45 by the capstan 43, are effected in the following manner.

A continuously operating driving shaft 87 (Fig. 2), which is rotatable in a plurality of bearings fixed to the vertical table plate 30, one of which bearings is indicated at 88, has fixed thereto a pair of cams 91 and 92. The shaft 87 is driven at a suitable speed in a clockwise direction, as indicated by the arrow (Fig. 2), from a speed reducing mechanism receiving its power from an electric motor (not shown). A lever 93 is pivoted at its lower end at 94 to a bracket 95 fixed to the table plate 29 and is bifurcated at its upper end and the two furcations thereof are forked to receive blocks 98—98 pivoted to opposite sides of the reciprocatory head 63, as indicated at 99—99. A coiled contractile spring 100, connected at its opposite ends to the lever 93, and the vertical table plate 30 normally urge the lever 93 in a counter-clockwise direction about its pivot 94 to maintain a cam roller 101 movable with the lever at all times in engagement with the peripheral face of the continuously rotating cam 91 until the slack in the sleeving is taken up. Thus, during operation of the apparatus, the lever 93 is resiliently urged in one direction by the spring 100 to actuate the head 63 during its feeding of the sleeving 44 and simultaneously therewith the insertion of the previously severed length thereof, the sleeve 22, into the fiber shell 15. In moving in the opposite direction, the lever 93 retracts the head 63, and this latter movement is effected directly by and under control of the cam 91, and at the same time energy is stored in the spring 100 for the following advance movement of the head. It is to be understood that the cam 91, in cooperation with the spring 100, is designed to actuate the lever 93 and reciprocate the head 63 through a stroke greater than the length of the section of sleeving 22 that is intermittently advanced and that the cam 91 serves to positively return the lever 93 and the head 63 to the same starting position as shown in full lines in Fig. 4 and that the spring 100 serves to yieldably actuate the lever and advance the head 63 under control of the cam 91 and to the extent of the length of strand unwound by the capstan 43 from the supply spool 45 during one revolution of the cam 91.

Fixed at its upper end to the pivotally mounted housing 78 for the drive shaft 77 of the oscillatable knife 46 is a lever 102, which carries a cam roller 105 at its lower end, the roller constantly engaging the peripheral face of the cam 92. A coiled contractile spring 106, connected at its opposite ends to the lever 102 and the table plate 20 maintains the cam roller 105 on the cam face, and at the same time normally urges the lever 102 and thereby the housing 78 to move about its pivots 80—80 in a counter-clockwise direction to retract the knife 46 from operative severing position with respect to the sleeving 44 under control of the cam 92, to the position shown in Fig. 4. In an opposite or clockwise movement of the lever 102, the knife 46 is advanced into operative severing relation with the sleeving 44 to the position shown in Fig. 2. This latter advanced movement of the lever 102 is effected directly by and under control of the cam 92 and at the same time energy is stored in the spring 106 for the following retractive movement of the knife 46.

The capstan 43 is fixed to an output shaft 107 of a speed-reducing mechanism 108, supported on the table plate 29. An input shaft 109 of the mechanism 108 is driven from the continuously driven shaft 87 by means of sprocket wheels 112 and 113 fixed to the shafts 87 and 109, respectively, and interconnected by a sprocket chain 114. The asbestos sleeving 44 is directed from the supply spool 45 in a horizontal plane through a guide tube 115 fixed to the table plate 29 and arranged in alignment with a peripheral receiving groove 116 of the capstan and is engaged in the groove for approximately one-quarter of its circumference. From the capstan 43, the sleeving 44 is directed vertically and passes through a guide tube 117 and thence over an arcuate shaped plate 119 into the hollow of the sleeve-like member 53 of the auxiliary sleeving feeding and sleeve inserting head 63. The guide tube 117 and plate 119 are supported from the base plate 49 and standard 51. An endless belt 120, trained around pulleys 121 and 122, serves to press and maintain the travelling sleeving 44 in the capstan groove 116 to effect the desired traction without slippage between the capstan and sleeving. The pulleys 121 and 122 are journalled on an angularly-shaped lever 123 pivoted at 126 on a standard 127 mounted on the table plate 29, to which is connected one end of a coiled retractile spring 128 having its opposite end connected to a standard 129 mounted on the table plate 29, the spring serving to normally urge the lever 123 about its pivot 126 in a clockwise direction to press the belt 120 against the sleeving 44. A handle portion 130 on the lever 123 provides means whereby the lever may be rocked about its pivot 126 in a counter-clockwise direction to withdraw the belt from its operative position relative to the sleeving 44 when threading the sleeving from the supply spool 45 and through the apparatus during setting up operations. A latch member 133, pivoted at 134 on the lever 123 and formed with a notch 135 for retaining engagement with a pin 136 carried on a bracket 137 depending from the table plate 29, serves to hold the lever in its retracted position with the belt 120 withdrawn from the sleeving 44.

A more complete understanding of the apparatus described above in detail may be had by the following description of the operation thereof. It will be assumed that the fiber shells 15 carried by the intermittently actuated chains 32—32 are being aligned one at a time with the auxiliary sleeving feeding and inserting mechanism 42 in timed relation to the latter's actuation, as well as that of the continuously rotating and oscillatable severing knife 46 and, further, that the continuously rotating cams 91 and 92 have been formed as well as adjusted relative to each other upon their driving shaft 87 to correctly time the periodic movements of the mechanism 42 and knife 46, which are controlled or effected by the cams 91 and 92, respectively. Also, that the capstan 43 is being rotated at a predetermined constant velocity proportional to the speed of the drive shaft 87 from the output shaft 107 of the speed reducing mechanism 108 to continuously feed a definite length of the delicate asbestos sleeving 44 from the supply spool 45 for each rotation of the shaft 87, such lengths of sleeving being the required length of sleeving to be inserted into a fuse shell 15 during each operating cycle of the apparatus.

Beginning the cycle of operation with the sleeving feeding and inserting head 63 in its fully retracted position and the oscillatable knife 46 having been retracted to its inoperative position, after having been advanced to and severed the sleeving 44 at the line 138, all as shown in Fig. 4, during the period of retraction of the head 63 and the slack length of sleeving 44 having been accumulated between the capstan 43 and the mechanism 42, as indicated by the waved length of sleeving at 139 (Fig. 2), the simultaneous feeding of the sleeving 44 by the head 63 and the insertion of the previously severed sleeve 22 into the aligned fiber shell 15 and the subsequent severing of the sleeving 44 to form the following sleeve 22 immediately follows in predetermined timed relation.

The sleeving feeding and inserting head 63 now advances to the left from its fully retracted position (Fig. 4) under the action of its resilient actuator, the spring 100, which is controlled by the continuously rotating cam 91 through the roller 101 and lever 93. As the head 63 advances to the broken outline position thereof (Fig. 4), the pawl pin 67 carried thereby impinges into the sleeving 44 and feeds the sleeving forward therewith past the knife 46, and at the same time the pawl pin 74 carried on the fixed standard 57, rides idly upon the sleeving. During this feeding of the sleeving 44, the slack length 139 thereof accumulated between the capstan 43 and the mechanism 42 is completely taken up since the latter mechanism is capable of feeding more sleeving past the knife than the capstan will supply during each feeding cycle due to the action of its resilient actuator 100 under control of the cam 91. Simultaneously with this feeding of the sleeving, the previously severed length of sleeving, the sleeve 22, which is abutting the forward end of the sleeving 44 at the line 138, is pushed into the aligned fiber shell 15.

Immediately upon the insertion of the sleeve 22 into the fiber shell 15, the head 63 is retracted to its full line position (Fig. 4) through the direct action of the cam 91, roller 101 and lever 93, during which movement the pawl pin 67 rides idly upon the sleeving 44, which is retained in its advanced position by the impinging of the pawl pin 74 thereinto, and thus no appreciable backward movement of the sleeving occurs. In timed relation to and during the retraction of the head 63, the continuously rotating and oscillatable knife 46 is swung into operative severing relation with the sleeving to the position shown in Fig. 2 by the direct action of the cam 92, roller 105 and lever 102, the sleeving being severed at the line 138 (Fig. 4). While the head 63 is being retracted and the sleeving severed, the assembled fiber shell 15 and sleeve 22 are moved forward and another fiber shell is advanced into alignment with the head 63 for the following cycle of feeding and severing the sleeving 44 and inserting the sleeve 22 into the fiber shell 15. It will be understood that, after the knife 46 severs the sleeving 44 and, by the time the head 63 is fully retracted, the knife has been retracted to its inoperative position (Fig. 4) by the action of the spring 106 under control of the cam 92, roller 105 and lever 102.

Also, during the retraction of the head 63, another slack length of sleeving 44 has been accumulated between the capstan 43 and the mechanism 42, as indicated at 139, for the following cycle of the apparatus, since the capstan is continually withdrawing the sleeving 44 from the supply spool 45 at a predetermined constant rate. This completes an operating cycle of the apparatus.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Mechanism for intermittently advancing a strand of flexible sleeving material through predetermined uniform distances comprising guide means, means on said guide means engageable with the strand for preventing the retraction of said strand, connecting means capable of being reciprocated along said guide means through a distance greater than said predetermined distance and operable to establish a connection with the strand and to advance the strand in response to advancing movement of said connecting means, means for returning said connecting means to a predetermined position on said guide means and for yieldably advancing said connecting means to advance said strand to the extent permitted by the slack formed therein, a capstan disposed in spaced relation to said guide means and having strand engaging surfaces for progressively gripping and releasing successive portions of said strand for withdrawing said strand from a supply and forming a slack therein intermediate the capstan and said guide means, and drive means operable in timed relation to the actuation of said reciprocable connecting means for actuating said capstan at a uniform speed to advance said strand through said predetermined distance.

2. A mechanism for feeding the strand into an apparatus comprising means for supporting a supply of said strand, a capstan having strand engaging surfaces for progressively gripping and releasing successive portions of said strand, drive means for continuously rotating said capstan for withdrawing a predetermined length of said strand from said supply and forming a slack in advance of said capstan, guide means in spaced relation to said capstan for guiding the free end of said portion of said strand, means on said guide means for preventing the retraction of the free end of said strand, gripping means capable of being reciprocated along said guide means through a distance greater than that through which the strand is to be intermittently fed and operable to grip and feed the strand in response to movement of said gripping means in one direction, spring means operatively connected to said gripping means to yieldably advance said gripping means from a starting position to feed the strand to the extent of the slack formed therein, and means operable in timed relation to the rotation of said capstan to return said gripping means to said starting position.

3. A strand feeding mechanism comprising a capstan having strand engaging surfaces for progressively gripping and releasing successive portions of said strand, drive means for rotating said capstan at a constant speed to withdraw a predetermined length of said strand from a supply thereof to form a slack in the strand in advance of said capstan, guide means in spaced relation to said capstan, gripping means capable of being reciprocated along said guide means through a distance greater than said predetermined length and operable to grip and feed the strand in response to movement of said gripping means in one direction, spring means operatively connected to said gripping means for moving said gripping means in one direction to advance said strand to the extent of the slack formed therein, means for preventing the retraction of said strand, a lever operatively connected to said gripping means, a rotatable cam for actuating said lever to control the advance movement of the gripping means and to return the gripping means to a starting position, and drive means operable in timed relation to said capstan for rotating said cam to effect a reciprocation of said gripping means.

References Cited in the file of this patent

UNITED STATES PATENTS

| Number | Name | Date |
|---|---|---|
| 933,890 | Cummings | Sept. 14, 1909 |
| 1,125,330 | Jagenberg | Jan. 19, 1915 |
| 1,252,140 | Morrison | Jan. 1, 1918 |
| 1,481,332 | Stock | Jan. 22, 1924 |
| 1,648,769 | Hugo | Nov. 8, 1927 |
| 1,787,657 | Andren et al. | Jan. 6, 1931 |
| 2,073,507 | Weimont | Mar. 9, 1937 |
| 2,156,049 | Boerger | Apr. 25, 1939 |
| 2,308,722 | Seeley | Jan. 19, 1943 |
| 2,444,706 | Loew | July 6, 1948 |
| 2,520,286 | Pietsch | Aug. 29, 1950 |
| 2,578,960 | Alger | Dec. 18, 1951 |